(12) United States Patent
Mooty et al.

(10) Patent No.: US 6,308,378 B1
(45) Date of Patent: Oct. 30, 2001

(54) FRICTIONAL GRIPPING ARRANGEMENT FOR A POWER TOOL HANDLE

(75) Inventors: Tom Mooty, Jackson, TN (US); Earl Clowers, Anderson, SC (US); Mark Etter, Jackson, TN (US); Daily Gist, Jackson, TN (US); Michael Lagaly, Jackson, TN (US)

(73) Assignee: Porter-Cable Corporation, Jackson, TN (US)

(*) Notice: Subject to any disclaimer, the term of this patent is extended or adjusted under 35 U.S.C. 154(b) by 0 days.

(21) Appl. No.: 09/577,652

(22) Filed: May 24, 2000

Related U.S. Application Data

(63) Continuation-in-part of application No. 29/105,748, filed on Jun. 1, 1999, now Pat. No. Des. 435,414.

(51) Int. Cl.[7] ................. B25G 3/00; B25G 1/01
(52) U.S. Cl. ................. 16/430; 16/431; 16/436; 16/DIG. 12; 81/489; 81/177.1; 408/124; 173/162.1; 310/47; 310/50
(58) Field of Search ............ 16/430, 436, 431, 16/DIG. 12, DIG. 18, DIG. 19; 81/489, 177.1; 408/124; 173/162.1, 162.2; 310/47, 50; D8/68

(56) References Cited

U.S. PATENT DOCUMENTS

| | | | |
|---|---|---|---|
| D. 315,855 | * 4/1991 | Fushiya et al. | D8/68 |
| D. 333,959 | * 3/1993 | MacWalters | D8/68 |
| D. 418,730 | * 1/2000 | Main | D8/68 |
| D. 419,413 | * 1/2000 | Heun | D8/68 |
| 3,189,069 | 6/1965 | Stowell . | |
| 4,711,308 | 12/1987 | Blaas et al. . | |
| 4,721,021 | 1/1988 | Kusznir . | |
| 4,739,536 | 4/1988 | Bandera et al. . | |
| 4,771,833 | 9/1988 | Honsa . | |
| 4,820,090 | 4/1989 | Chen . | |
| 4,986,147 | 1/1991 | Cooper . | |
| 5,311,949 | 5/1994 | Chapin . | |
| 5,353,474 | 10/1994 | Good et al. . | |
| 5,390,572 | 2/1995 | Gakhar et al. . | |
| 5,475,894 | * 12/1995 | Wildforster | 16/430 |
| 5,511,445 | 4/1996 | Hildebrandt . | |
| 5,530,989 | 7/1996 | Remmert et al. . | |
| 5,606,772 | 3/1997 | Ilic . | |
| 5,718,014 | 2/1998 | deBlois et al. . | |
| 5,722,116 | 3/1998 | Lin . | |
| 5,740,586 | 4/1998 | Gomas . | |
| 5,781,958 | 7/1998 | Meessmann et al. . | |

(List continued on next page.)

*Primary Examiner*—Chuck Y. Mah
(74) *Attorney, Agent, or Firm*—Merchant & Gould P.C.

(57) ABSTRACT

An arrangement of frictional gripping zones on the handle of a power tool is disclosed. The power tool has a main body portion and a handle portion depending from the main body portion. The handle portion includes a first side region, a second side region opposite the first side region, a rear region connecting the first and second side regions along a rear of the handle portion, and a front region connecting the first and second side regions along a front of the handle portion. A plurality of alternating first and second gripping zones extend longitudinally along each of the first and second side regions of the handle portion. The first gripping zones are made the first gripping zones being made from a first material and the second gripping zones are made from a second material different from the first material. Preferably, the material of the second gripping zones have a hardness greater than the material of the first gripping zones. Furthermore, a third gripping zone is made from the second material and extends longitudinally along substantially the entire front and rear regions of the tool handle. The first gripping zones are preferably sized and configured to correspond to the contour of the power tool handle to provide the user with an efficient frictional gripping when operating the power tool.

21 Claims, 5 Drawing Sheets

U.S. PATENT DOCUMENTS

| | | |
|---|---|---|
| 5,781,963 | 7/1998 | Maru et al. . |
| 5,819,594 | 10/1998 | Sjovall . |
| 5,822,830 | 10/1998 | Lin . |
| 5,856,715 * | 1/1999 | Peot et al. .............................. 310/50 |
| 5,857,241 | 1/1999 | Camp, Jr. et al. . |
| 5,862,571 | 1/1999 | Naft et al. . |
| 5,873,148 | 2/1999 | Arnold . |
| 6,119,681 * | 9/2000 | Lilke ................................... 126/401 |
| 6,148,701 * | 11/2000 | Lee ....................................... 81/489 |
| 6,149,356 * | 11/2000 | Chu et al. ........................... 408/124 |
| 6,161,256 * | 12/2000 | Quiring et al. ...................... 16/431 |
| 6,237,193 * | 5/2001 | Skerker et al. ...................... 16/430 |

* cited by examiner

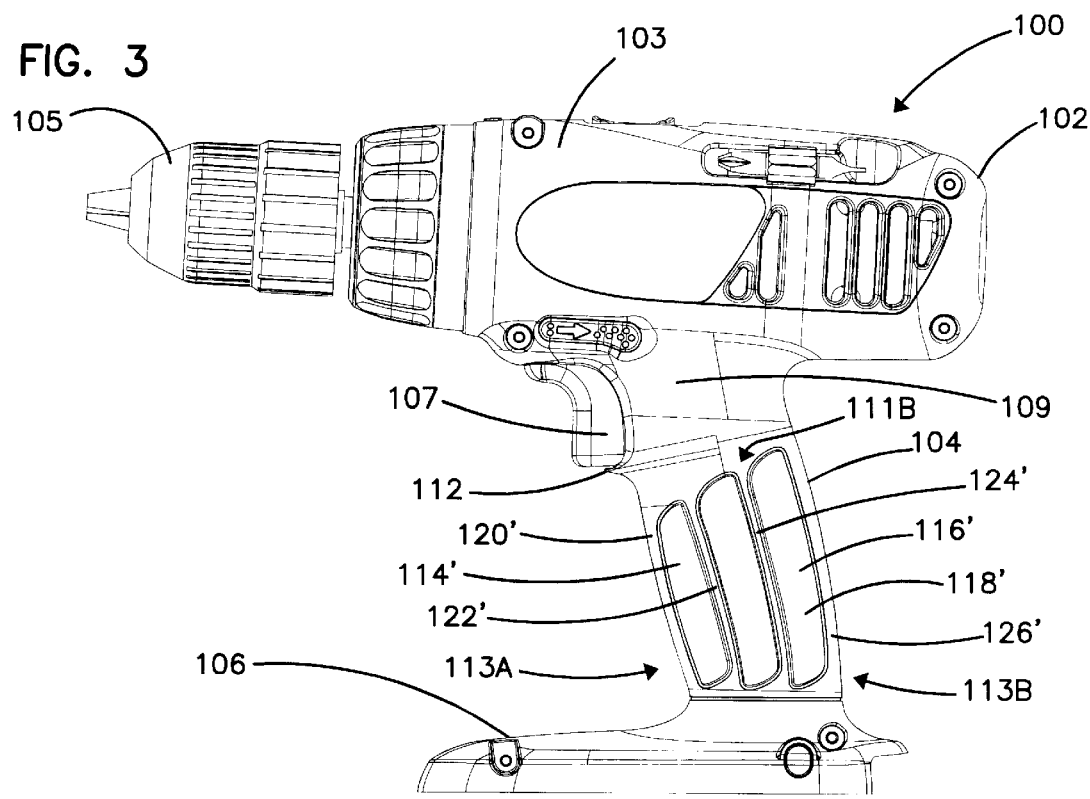
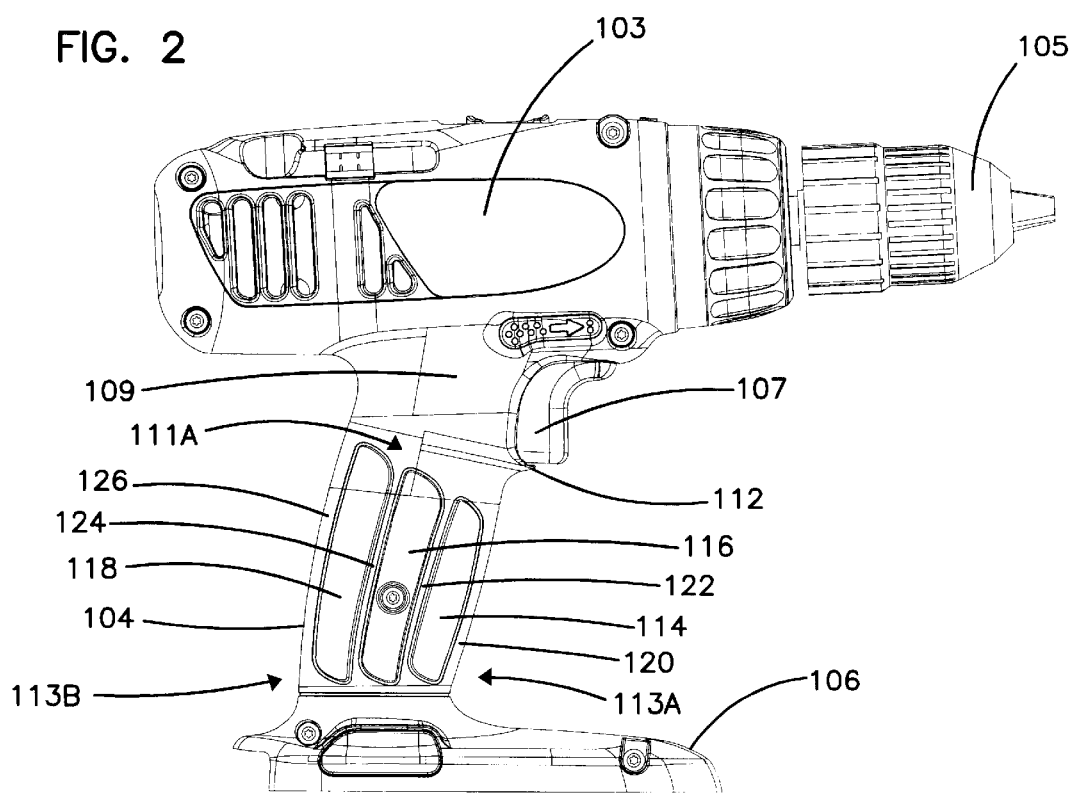

FRICTIONAL GRIPPING ARRANGEMENT FOR A POWER TOOL HANDLE

CLAIM FOR PRIORITY UNDER 35 U.S.C. §120

This application is a continuation-in-part and claims priority under 35 U.S.C. §120 to U.S. patent application Ser. No. 29/105,748, filed Jun. 1, 1999, entitled "BATTERY POWERED DRILL/DRIVER," now U.S. Pat. No. Des. 435,414, the entire disclosure of which is hereby incorporated by reference.

TECHNICAL FIELD

The present invention relates to power tools, and more particularly, to an arrangement of frictional gripping zones on the handle of a power tool.

BACKGROUND

Generally, power tools have several advantages over manual hand tools. For example, power tools typically provide significant savings in time and effort as well as improved precision when compared to manual hand tools. Furthermore, actuation of the power tool typically requires minimal manual input effort (i.e. depressing a trigger). As a result, power tools often can be used from awkward positions and in hard-to-reach areas without loss of range of motion or effectiveness of the tool. Because of these advantages, the popularity of power tools has increased among both professional and novice craftsmen.

While these advantages are significant, there are drawbacks associated with the use of power tools. As is commonly understood, when operating a power tool, the operator grips the handle of the power tool and actuates a switch mechanism to "turn on" or engage the power tool. By actuating the switch mechanism, the electric motor disposed within the power tool housing is energized. One of the drawbacks associated with power tools is that the working material and the electric power tool typically vibrate during use. This vibration can cause the operator to loose his grip on the power tool during operation requiring frequent readjustments of the hand on the tool handle. Perhaps more significantly, the vibration associated with power tools can cause the operator to experience muscle fatigue during operation. Typically, the amount of vibration varies with respect to the size of the power tool.

Another drawback associated with power tools relates to the fact that many existing power tools include a housing that is typically made from a hard, rigid material to allow the tool to withstand the rigors associated with its use. As a result, it is often difficult for the operator to maintain a firm grip on the handle of the hard, rigid housing during operation.

Several improvements to power tool handles have been developed to address these drawbacks. For example, some existing power tools provide a single gripping zone along the power tool handle to ease the vibrational forces associated with the use of the tool and to provide a more suitable gripping surface along the handle. Alternatively, other existing power tool handles provide gripping zones that completely surround and cover the handle of the power tool. Still yet, other existing power tool handles provide gripping zones that cover substantially the entire rear portion of the handle of the power tool so as to engage the webbing of the operator's hand.

However, there are several shortcoming with existing gripping arrangements. For example, because some existing gripping arrangements completely surround the handle of the power tool, it is often difficult for the operator to adjust his hand on the handle without completely removing and replacing the hand on the power tool handle. Furthermore, existing gripping arrangements fail to conform to the contour of the tool handle and, hence, the shape of the operator's hand. As a result, many existing gripping arrangements fail to provide the operator with an efficient frictional gripping arrangement when operating the power tool.

Improvements in the handles and the arrangement of gripping zones on power tool handles are sought.

SUMMARY OF THE INVENTION

The present disclosure generally relates to power tools. More particularly, the present disclosure relates to an arrangement of frictional gripping zones on the handle of a power tool. An arrangement of frictional gripping zones is provided on a power tool having a main body portion and a handle portion depending from the main body portion. A plurality of alternating first and second gripping zones extend longitudinally along the handle of the power tool.

In one aspect of the invention, the handle portion includes a first side region, a second side region opposite the first side region, a rear region connecting the first and second side regions along a rear of the handle portion, and a front region connecting the first and second side regions along a front of the handle portion, and second side regions of the handle portion. The first gripping zones are made the first gripping zones being made from a first material and the second gripping zones are made from a second material different from the first material. Preferably, the material of the second gripping zones has a hardness greater than the material of the first gripping zones. Furthermore, a third gripping zone is made from the second material and extends longitudinally along substantially the entire front and rear regions of the tool handle. The first gripping zones are preferably sized and configured to correspond to the contour of the power tool handle to provide the user with an efficient frictional gripping when operating the power tool.

In another aspect of the invention, each of the first gripping zones has a longitudinal dimension that is substantially equal for each of the first gripping zones. Similarly, in another aspect of the disclosure, the longitudinal dimension of each of the first gripping zones is different. In yet another aspect of the invention, the longitudinal dimension for each of the first gripping zones decreases successively from the rear of the handle towards the front of the handle. In so doing, the arrangement of frictional gripping zones along the handle portion of the power tool are arranged to correspond to the contours of the handle as well as the operator's hand to provide an efficient frictional gripping when the operating the power tool.

In another aspect of the invention, each of the second gripping zones have a first width along the first and second side regions and a second width along the front and rear regions of the tool handle. The second width of the second gripping zones is substantially equal to the width of the front and rear regions. Preferably, the width of the second gripping zones along the first and second side regions is no greater than 25% of the width of the first gripping zones along the first and second side regions.

The above summary of the present invention is not intended to describe each illustrated embodiment or every implementation of the present invention. Other objects, features and advantages of the present invention will become more apparent in light of the following detailed description of exemplary embodiments thereof, as illustrated in the accompanying drawings.

BRIEF DESCRIPTION OF THE DRAWINGS

The invention may be more completely understood in consideration of the following detailed description of various embodiments of the invention in connection with the accompanying drawings, in which:

FIG. 2 is a side-elevational view illustrating a first side of the power tool shown in FIG. 1;

FIG. 3 is a side-elevational view illustrating a second side of the power tool shown in FIG. 1 opposite the first side of the power tool shown in FIG. 2;

Figure 1:
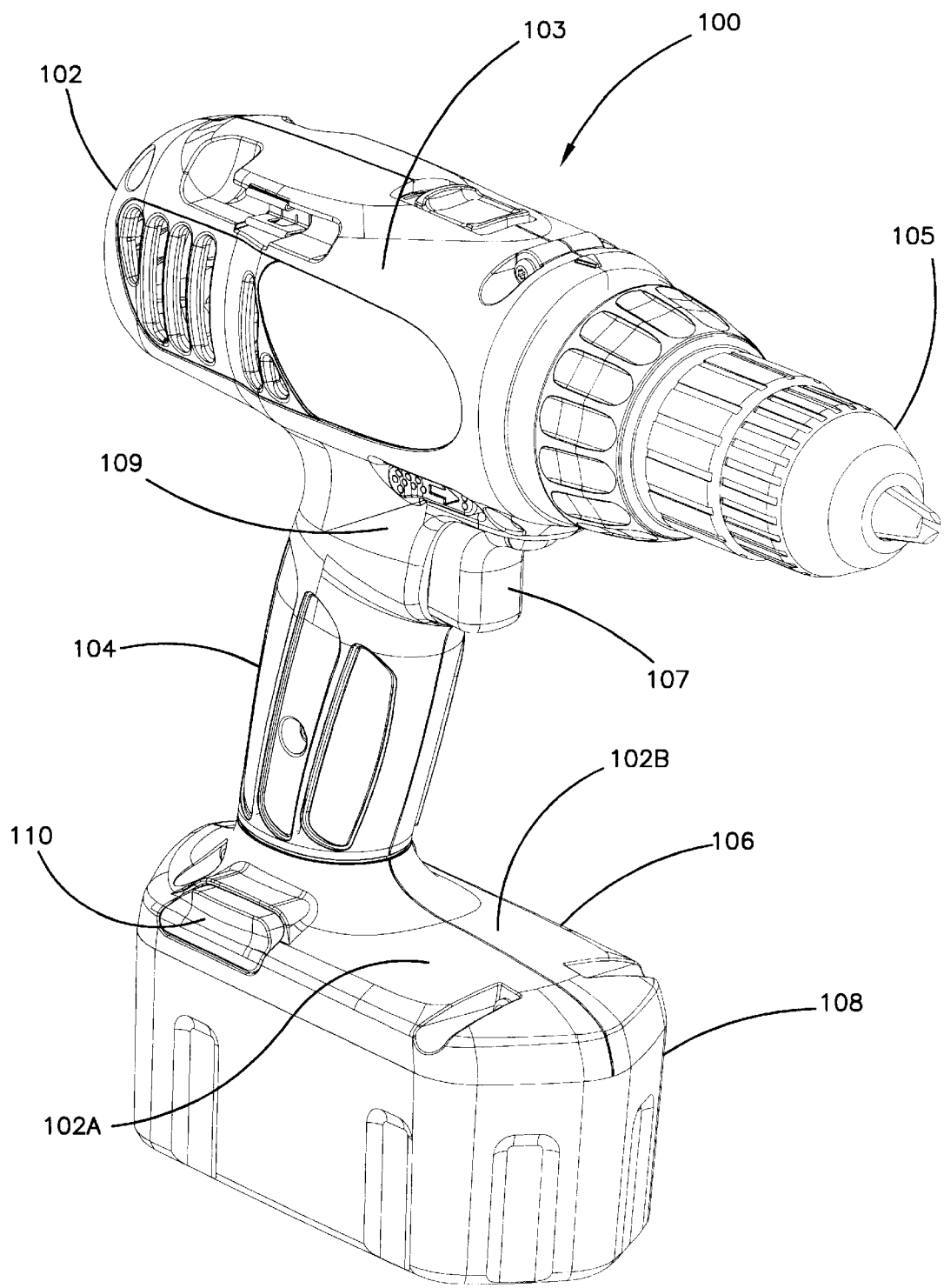
FIG. 1 is a perspective view illustrating a power tool having a battery pack secured to the tool.
Figures 4, 5:
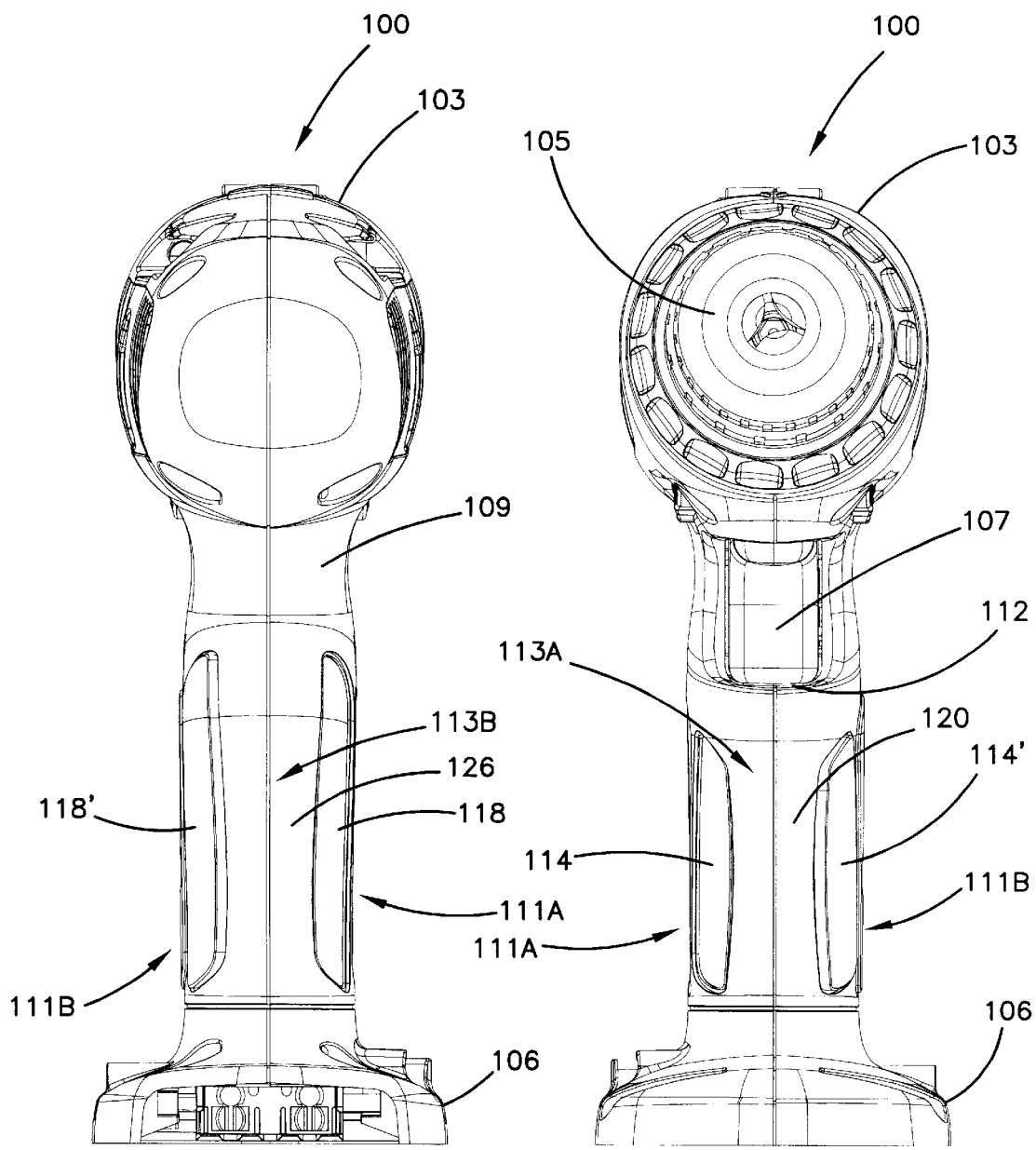
FIG. 4 is a side-elevational view illustrating the front of the power tool shown in FIGS. 1–3.
FIG. 5 is a side-elevational view illustrating the rear of the power tool shown in FIGS. 1–4.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present disclosure generally relates to power tools. More particularly, the present disclosure is directed towards an arrangement of frictional gripping zones on a handle of a power tool. While the present invention is not so limited, a more detailed understanding of the present invention will be gained through a discussion of the drawings in connection with the examples provided below.

Referring now to FIG. 1, there is illustrated a cordless electric power tool 100. By way of illustration, the power tool 100 shown in FIG. 1 is an electric power drill/driver. However, it should be understood that the present invention is generally applicable to a variety of power tools, including corded as well as cordless power tools, for example, circular saws, reciprocating saws, planars, as well as other power tools having a handle for gripping and using the power tool.

The power tool 100 has a housing 102 that is preferably molded from a suitable plastic material, such as polyethylene, polypropylene, or polyurethane. In a preferred embodiment, the power tool housing 102 is injection molded having two halves portions 102A, 102B. The two halve portions 102A, 102B are secured together in a conventional manner using mechanical fasteners (not shown), such as screws. The tool housing 102 includes a generally tubular and elongated main body portion 103. An electric motor (not shown) is disposed within the body portion 103. The electric motor is electrically coupled to a battery pack 108 that provides the electrical energy to power the electric motor. Furthermore, the electric motor is mechanically coupled to an output shaft 105 that can be configured to operate with various tool accessories. For example, the output shaft 105 is a conventional drill chuck that can be configured to operate with tool accessories, such as, drill bits, drivers, or other accessories.

Still referring to FIG. 1, the power tool 100 also includes a support portion 106 that is integral with the handle portion 104. The support portion 106 is generally flat and elongated and extends in a direction substantially parallel to the elongated main body portion 103. The support portion 106 stabilizes the power tool 100 when resting on a flat surface in an upright position as shown in FIG. 1. A battery pack 108 is releasably secured to the support portion 106 of the power tool 100. In one embodiment, the battery 108 can be released from the power tool 100 by depressing the button 110 which is disposed through a side of the handle portion 104.

The tool housing 102 also includes a handle portion 104 that extends downwardly from the main body portion 103. By "downwardly," it is meant that in the orientation of the power tool 100 shown in FIG. 1, the handle portion 104 extends below the main body portion 103 of the power tool 100. The handle portion 104 is configured and arranged to allow a user to easily grip and maneuver the power tool 100 during operation. As shown in FIGS. 2–5, the handle portion 104 includes a first side region 111A and a second side region 111B opposite the first side region 111A. Additionally, the handle portion 104 includes a front region 113A connecting the first and second side regions 111A, 111B along the front of the power tool, and a rear region 113B connecting the first and second side regions 111A, 111B along the rear of the power tool 100. In the embodiment shown in FIGS. 2–5, the first side region 111A is the "right-hand" side of the handle portion 104 and the second side region 111B is the "left-hand" side of the handle portion 104.

The power tool housing 102 also defines a trigger receiving portion 109 disposed between the main body portion 103 and the handle portion 104. More particularly, the trigger receiving portion 109 is disposed between the main body portion 103 and the front region 113A. The trigger receiving portion 109 is sized and configured to allow the operator to engage a trigger 107 disposed through the trigger receiving portion 109. Moreover, the trigger receiving portion 109 defines a ridge 112 that separates the trigger receiving portion 109 from the handle portion 104. The ridge 112 assists the operator in properly aligning his hand on the handle portion 104 when operating the power tool 100. For example, when the operator is gripping the power tool 100, the operator typically uses his trigger finger (eg. the operator's forefinger) to actuate the trigger 107. While the operator's trigger finger is positioned over the trigger receiving portion 109, the ridge 112 ensures that the operator's other fingers are positioned below the trigger 107 and are, therefore, unable to actuate the trigger 107.

An arrangement of frictional gripping zones or pads is provided along the first and second side regions 111A, 111B of the handle portion 104. The arrangement of frictional gripping zones includes a plurality of first gripping zones 114, 116, 118 alternating with a plurality of second gripping zones 122, 124 extending longitudinally along the first side region 111A as shown in FIG. 2. In a preferred embodiment, the arrangement of frictional gripping zones includes at least three first gripping zones 114, 116, 118 alternating with the second gripping zones 122, 124. Each of the first gripping zones or pads 114, 116, 118 have a longitudinal dimension measured along the longitudinal direction of the handle portion 104.

The arrangement of frictional gripping zones includes a plurality of alternating gripping zones of a softer material and a harder material. Preferably, the material of the second gripping zones 122, 124 has a hardness greater than the material of the first gripping zones 114, 116, 118 measured using a conventional hardness measuring device, such as a durometer. In one embodiment, the material of the first gripping zones 114, 116, 118 is a thermoplastic elastomer or rubber material, such as the thermoplastic elastomer material sold under the brand name SANTOPRENE® by Advanced Elastomer Systems. The material of the second gripping zones 122, 124 is preferably the same material as and integral with the tool housing 102. The tool housing 102 can be molded to include recesses (not shown) that are sized and configured receive the first gripping zones 114, 116, 118. The first gripping zones 114, 116, 118 can be insert molded directly into the recesses formed in the tool housing 102. Alternatively, the first gripping zones 114, 116, 118 can be affixed to the surface of the tool housing 102 using any suitable adhesive or a mechanical fastener. Still yet, the first gripping zones 114, 116, 118 can be affixed to the tool housing 102 using a dual-injection molding process. Furthermore, in one embodiment, the first gripping zones 114, 116, 118 are substantially coplanar with the second griping zones 122, 124. Alternatively, the first gripping zones 114, 116, 118 are slightly raised from the surface of the tool housing 102.

The first gripping zones 114, 116, 118 are generally rectangular in shape and extend along the longitudinal direction of the handle portion 104. In one embodiment, the longitudinal dimension for each of the first gripping zones 114, 116, 118 is substantially equal. However, in the preferred embodiment as shown in FIG. 2, each of the first gripping zones 114, 116, 118 extend upwards along the longitudinal direction of the handle portion 104 to a position just below or beneath the trigger receiving portion 109. Furthermore, as shown in FIG. 2, the longitudinal dimension for each of the first gripping zones 114, 116, and 118 decreases successively from the rear of the handle portion 104 to the front of the handle portion 104. Accordingly, the frictional gripping zone nearest the rear portion 113B of the handle portion 104 (e.g. gripping zone 118) is the longest. Conversely, the gripping zone nearest the front portion 113A of the handle portion 104 (e.g. gripping zone 114) are the shortest and is positioned below the trigger receiving portion 109. Accordingly, the arrangement of frictional gripping zones follows the contours or shape of the tool handle portion 104.

Moreover, the width of the first gripping zones 114, 116, 118 is different from the second gripping zones 122, 124. For example, as shown in FIG. 2, the first gripping zones 114, 116, 118 are wider than the second gripping zones 122, 124. In one embodiment, the width of the second gripping zones 122, 124 is no greater than about 25%, typically about 5–20%, and preferably about 10% of the width of the first gripping zones 114, 116, 118. A third gripping zone 120, 126 are defined along the front and rear regions 113A, 113B and have a width greater than the width of the second gripping zones along the first and second side regions 111A, 111B. In one embodiment, the width of the third gripping zone 120, 126 is substantially equal to the width of the front and rear regions 113A, 113B and are made of the second material. Accordingly, the front and rear regions 113A, 113B are made substantially entirely from the hard second material and, therefore, provide minimal frictional resistance to the operator's hand on the handle portion 104. As a result, the operator can easily adjust his hand on the handle portion 104 without having to completely remove his hand on the handle 104.

Now referring to FIG. 3, it is apparent that the first and second side regions 111A, 111B are symmetrical. The arrangement of frictional gripping zones along the second side region 111B also includes a plurality of first gripping zones or pads 114', 116', 118' alternating with a plurality of second gripping zones 122', 124' along the second side region 111B. The frictional gripping zones 114', 116', 118' extend longitudinally along the second side region 111B. As discussed above, the arrangement of frictional gripping zones includes at least three gripping zones or pads 114', 116', 118' alternating with the second gripping zones 122', 124'. Each of the first gripping zones or pads 114', 116', 118' have a longitudinal dimension measured along the longitudinal direction of the handle portion 104.

The arrangement of frictional gripping zones along the second side region 111B includes a plurality of alternating gripping zones of a softer material and a harder material. Preferably, the material of the second gripping zones 122', 124' has a hardness greater than the material of the first gripping zones 114', 116', 118' measured using a conventional hardness measuring device, such as a durometer. As with the first gripping zones 114, 116, 118 on the first side region 111A, the material of the first gripping zones 114', 116', 118' on the second side region 111B is a thermoplastic elastomer or rubber material, such as the thermoplastic elastomer material sold under the brand name SANTO-PRENE®. The material of the second gripping zones 122', 124' is preferably the same material as and integral with the tool housing 102. Thus, the tool housing 102 can be molded to include recesses (not shown) that are sized and configured receive the first gripping zones 114', 116', 118'. The first gripping zones 114', 116', 118' can be insert molded directly into the recesses formed in the tool housing 102. Alternatively, the first gripping zones 114', 116', 118' can be affixed to the surface of the tool housing 102 using any suitable adhesive or a mechanical fastener. Still yet, the first gripping zones 114, 116, 118 can be affixed to the tool housing 102 using a dual-injection molding process. Furthermore, in one embodiment, the first gripping zones 114', 116', 118' are substantially coplanar with the second griping zones 122', 124'. Alternatively, the first gripping zones 114', 116', 118' are slightly raised from the surface of the tool housing 102.

The first gripping zones 114', 116', 118' are generally rectangular in shape and extend upwards along the longitudinal direction of the handle portion 104. In one embodiment, the longitudinal dimension for each of the first gripping zones 114', 116', 118' is substantially equal. However, in the preferred embodiment as shown in FIG. 3, each of the first gripping zones 114', 116', and 118' extend upwards along the longitudinal direction of the handle portion 104 to a position just below or beneath the trigger receiving portion 109. Furthermore, as shown in FIG. 3, the longitudinal dimension for each of the first gripping zones 114', 116', and 118' decreases successively from the rear of the handle portion 104 to the front of the handle portion 104. Accordingly, the frictional gripping zone nearest the rear portion 113B of the handle portion 104 (e.g. gripping zone 118') is the longest. Conversely, the gripping zone nearest the front portion 113A of the handle portion 104 (e.g. gripping zone 114') are the shortest and is positioned below the trigger receiving portion 109. Accordingly, the arrangement of frictional gripping zones follows the contours or shape of the tool handle portion 104.

Moreover, the width of the first gripping zones 114', 116', 118' is different from the second gripping zones 122', 124'. For example, as shown in FIG. 3, the first gripping zones 114', 116', 118' are wider than the second gripping zones 122', 124'. In one embodiment, the width of the second gripping zones 122', 124' is no greater than about 25%, typically about 5–20%, and preferably about 10% of the width of the first gripping zones 114', 116', 118'.

As discussed above, the frictional gripping arrangement on both the first and second side regions 111A, 111B are sized and constructed to conform to the power tool 100. By "conform," it is meant that the gripping arrangement follows the shape and contour of the handle portion 104. For example, the first gripping zones 114, 116, 118 on the first side 111A and 114', 116', 118' on the second side 111B are shaped and arranged to follow the contour of tool handle portion 104.

Moreover, the gripping arrangement is positioned along the handle portion 104 to correspond to the operator's hand. By "correspond," it is meant that the gripping arrangement matches the anatomical region of the operator's hand on the handle portion 104. For example, during operation, the operator's hand is placed on the handle portion 104 in a conventional manner such that the operator's palm and/or the webbing between the operator's thumb and forefinger are placed near the rear region 113B of the handle portion 104. Conversely, the operator's finger tips wrap around the front region 113A of the handle portion 104. Consequently, the operator's hand covers a larger area at or substantially near the rear region 113B of the handle portion 104. Similarly, the operator's hand covers a relatively smaller area at or substantially near the front region 113A. As discussed above, in one embodiment the alternating gripping zones have different longitudinal lengths, decreasing successively from the rear of the tool to the front of the power tool 100. Thus, the first gripping zones 118, 118' nearest the rear region 113B correspond to the location where the operator's palm rests on the handle portion 104. Similarly, the first gripping zones 114, 114' nearest the front region 113A of correspond to the location where the operator's finger tips rest on the handle portion 104. In so doing, the arrangement of frictional gripping zones along the handle portion 104 of the power tool 100 correspond to the contours of the handle and the operator's hand to provide an efficient frictional gripping when the operating the power tool.

Figure 6:
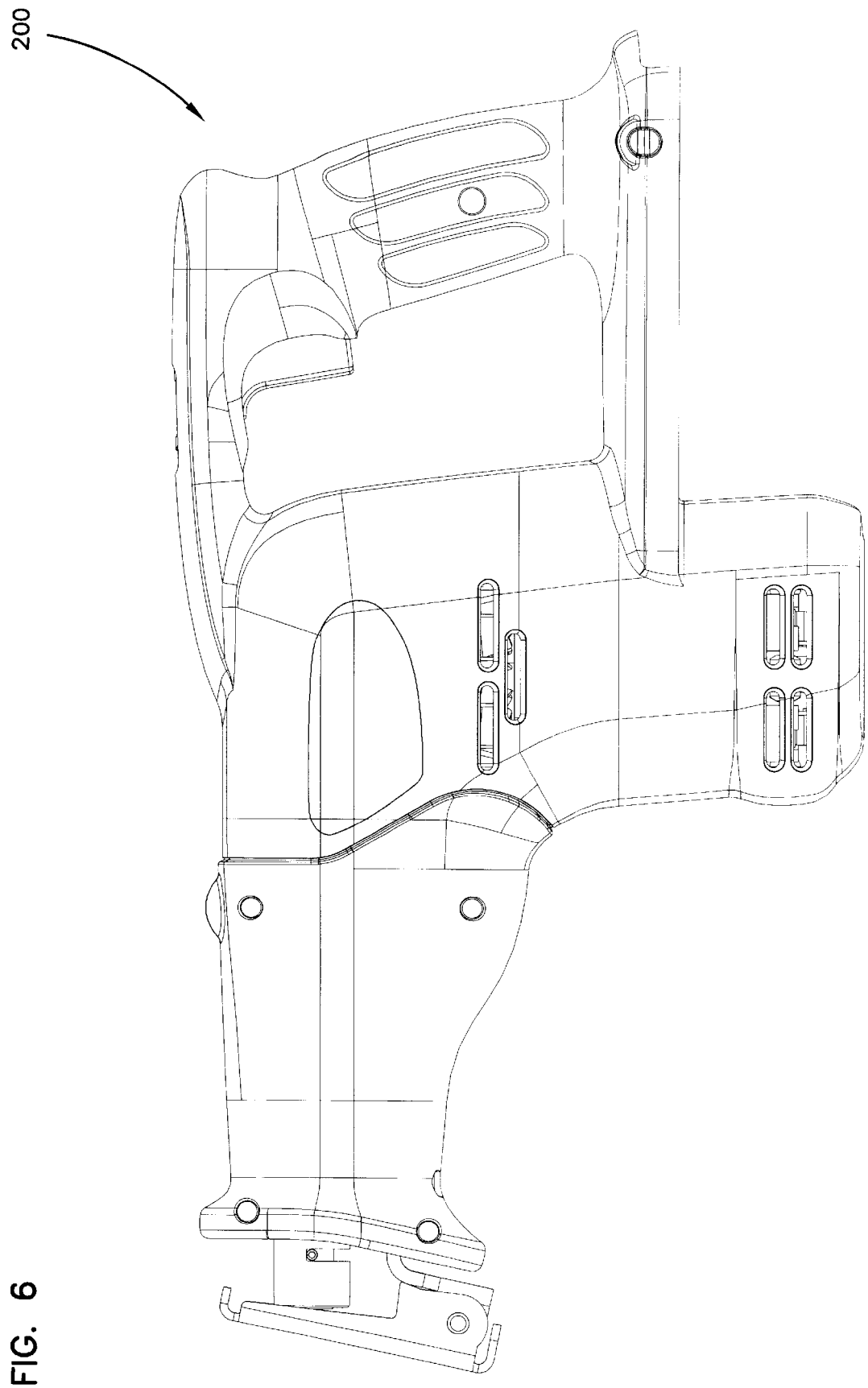
FIGS. 6 and 7 are side-elevational views illustrating alternative embodiments of the arrangement of frictional gripping zones of the present disclosure.
Figure 7:
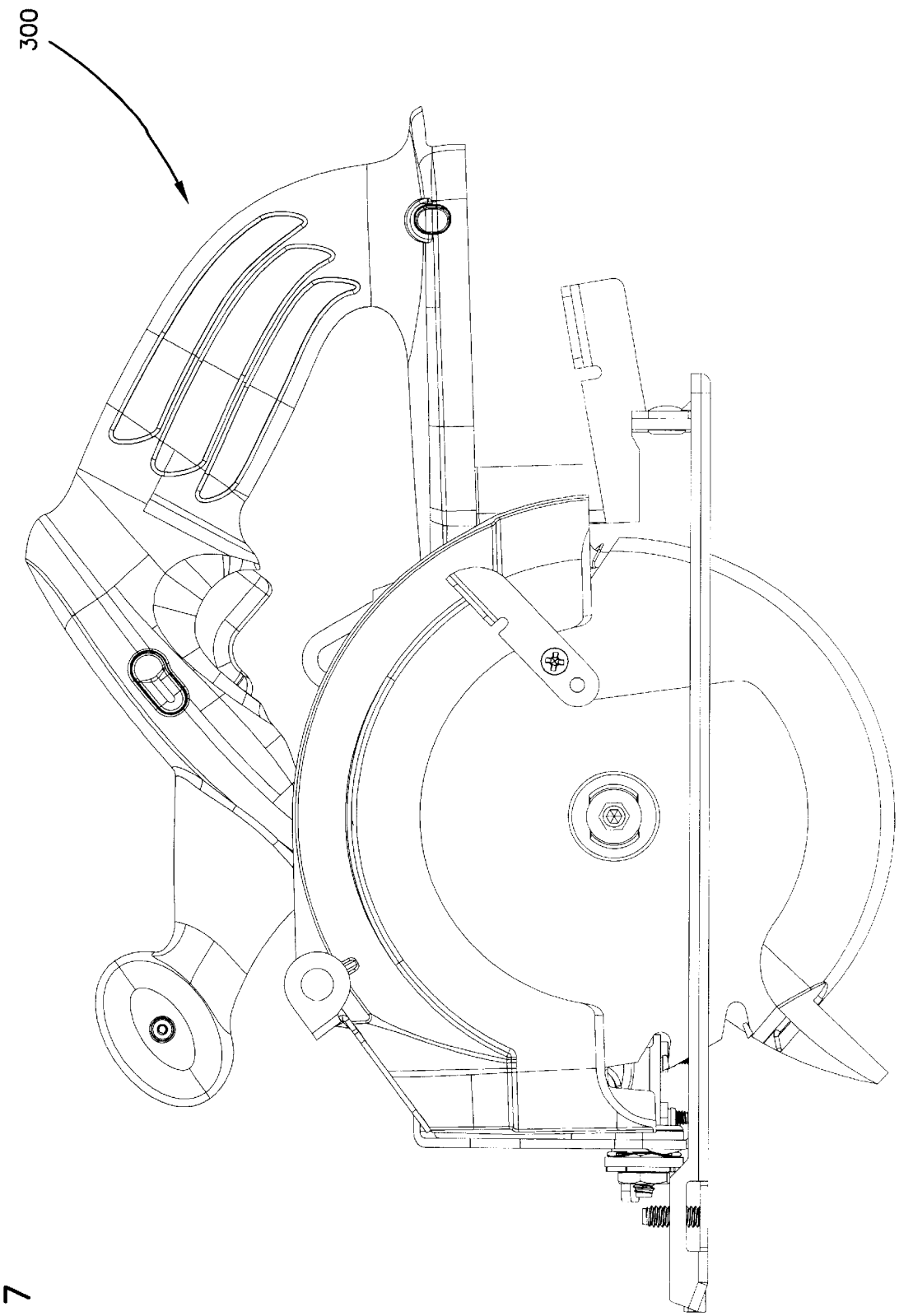

As mentioned above, the power tool 100 shown in FIGS. 1–5 is an electric power drill/driver. However, it should be understood that the present invention is generally applicable to a variety of power tools, including corded as well as cordless power tools, for example, circular saws, reciprocating saws, planars, as well as other power tools having a handle for gripping and using the power tool. For example, FIG. 6 shows a reciprocating saw 200 having an arrangement of frictional gripping zones in accordance with the present disclosure. Similarly, FIG. 7 shows a circular saw 300 having an arrangement of frictional gripping zones in accordance with the present disclosure.

The above specification and embodiments are believed to provide a complete description of the manufacturer and use of particular embodiments of the invention. Many embodiments of the invention can be made without departing from the spirit and scope of the invention, which is limited by the attached claims.

We claim:

1. An arrangement of frictional gripping zones on a power tool having a main body portion and a handle portion depending from the main body portion, the handle portion including a first side region, a second side region opposite the first side region, a rear region connecting the first and second side regions along a rear of the handle portion, and a front region connecting the first and second side regions along a front of the handle portion, the arrangement comprising:

(a) a plurality of alternating first and second gripping zones extending longitudinally along each of the first and second side regions of the handle portion;
 (i) the first gripping zones being made from a first material; and
 (ii) the second gripping zones being made from a second material having a hardness greater than the first material;
(b) a third gripping zone made from the second material and extending longitudinally along substantially the entire front and rear regions; and
(c) the first and second gripping zones being sized and configured to correspond to the contour of the handle portion to provide the user with an efficient frictional gripping when operating the power tool.

2. The arrangement of claim 1, wherein:
(a) each of the first gripping zones has a longitudinal dimension, wherein the longitudinal dimension for each of the first gripping zones is substantially equal.

3. The arrangement of claim 1, wherein:
(a) each of the first gripping zones has a longitudinal dimension, wherein the longitudinal dimension for each of the first gripping zones is different.

4. The arrangement of claim 1, wherein the arrangement includes:
(a) three of the first gripping zones extending longitudinally along each of the first and second side regions of the handle portion.

5. The arrangement of claim 1, wherein:
(a) each of the first gripping zones has a longitudinal dimension, wherein the longitudinal dimension for each of the first gripping zones decreases successively from the rear of the handle portion towards the front of the handle portion.

6. The arrangement of claim 5, the power tool further having a trigger receiving portion disposed between the main body portion and the front region of the handle portion, the trigger receiving portion being sized and configured to allow a user to engage a trigger disposed though the trigger receiving portion and further being positioned above at least one gripping zone on the handle portion.

7. The arrangement of claim 6, wherein the trigger receiving portion defines a ridge member separating the trigger receiving portion and the handle portion, the ridge member for aiding proper alignment of the user's hand on the handle portion when operating the power tool and further being positioned above at least one gripping zone on the handle portion.

8. The arrangement of claim 1, wherein:
(a) the first material is a thermoplastic elastomer.

9. An arrangement of frictional gripping zones on a power tool having a main body portion and a handle portion depending from the main body portion, the handle portion including a first side region, a second side region opposite the first side region, a rear region connecting the first and second side regions along a rear of the handle portion, and a front region connecting the first and second side regions along a front of the handle portion, the arrangement comprising:

(a) a plurality of alternating first and second gripping zones extending longitudinally along the first and second side regions of the handle portion;
 (i) the first gripping zones being made from a first material; and
 (ii) the second gripping zones being made from a second material having a hardness greater than the first material;

(A) the first gripping zones having a width along the first and second side regions;

(B) the second gripping zones having a width along the first and second side regions, the width of the second gripping zones along the first and second side regions being less than the width of the first gripping zones along the first and second side regions;

(b) a third gripping zone made from the second material and extending longitudinally along substantially the entire front and rear regions; and (c) the first and second gripping zones being sized and configured to correspond to the contour of the handle portion to provide the user with an efficient frictional gripping when operating the power tool.

10. The arrangement of claim 9, wherein:

(a) each of the first gripping zones has a longitudinal dimension, wherein the longitudinal dimension for each of the first gripping zones is substantially equal.

11. The arrangement of claim 9, wherein the arrangement includes:

(a) three first gripping zones extending longitudinally along each of the first and second side regions of the handle portion.

12. The arrangement of claim 9, wherein:

(a) each of the first gripping zones has a longitudinal dimension, wherein the longitudinal dimension for each of the first gripping zones is different.

13. The arrangement of claim 12, wherein:

(a) each of the first gripping zones has a longitudinal dimension, wherein the longitudinal dimension for each of the first gripping zones decreases successively from the rear of the handle portion towards the front of the handle portion.

14. The arrangement of claim 13, the power tool further having a trigger receiving portion disposed between the main body portion and the front region of the handle portion, the trigger receiving portion being sized and configured to allow a user to engage a trigger disposed though the trigger receiving portion and further being positioned above at least one gripping zone on the handle portion.

15. The arrangement of claim 14, wherein the trigger receiving portion defines a ridge member separating the trigger receiving portion and the handle portion, the ridge member for aiding proper alignment of the user's hand on the handle portion when operating the power tool and further being positioned above at least one gripping zone on the handle portion.

16. The arrangement of claim 9, wherein:

(a) the width of the second gripping zones is no greater than 25% of the width of the first gripping zones.

17. The arrangement of claim 9, wherein:

(a) the first material is a thermoplastic elastomer.

18. A cordless power tool comprising:

(a) a main body portion; and (b) a handle portion depending from the main body portion, the handle portion including a first side region, a second side region opposite the first side region, a rear region connecting the first and second side regions along a rear of the handle portion, and a front region connecting the first and second side regions along a front of the handle portion, the handle portion defining an arrangement of frictional gripping zones, the arrangement including:

(i) at least three first gripping zones alternating with at least two second gripping zones, the first and second gripping zones extending longitudinally along each of the first and second side regions of the handle portion;

(A) the first gripping zones being made from a first material; and (B) the second gripping zones being made from a second material having a hardness greater than the first material;

(ii) a third gripping zone made from the second material and extending longitudinally along substantially the entire front and rear regions; and (iii) the first and second gripping zones being sized and configured to correspond to the contour of the handle portion to provide the user with an efficient frictional gripping when operating the power tool.

19. The power tool of claim 18, wherein:

(a) each of the first gripping zones has a longitudinal dimension, wherein the longitudinal dimension for each of the first gripping zones is substantially equal.

20. The power tool of claim 18, wherein:

(a) each of the first gripping zones has a longitudinal dimension, wherein the longitudinal dimension for each of the first gripping zones is different.

21. The power tool of claim 18, wherein:

(a) each of the first gripping zones has a longitudinal dimension, wherein the longitudinal dimension for each of the first gripping zones decreases successively from the rear of the handle portion towards the front of the handle portion.

* * * * *